Jan. 26, 1965   T. BUDZICH ETAL   3,166,905
FLUID DISTRIBUTING AND CIRCULATING SYSTEM
Filed Oct. 15, 1962   4 Sheets-Sheet 1
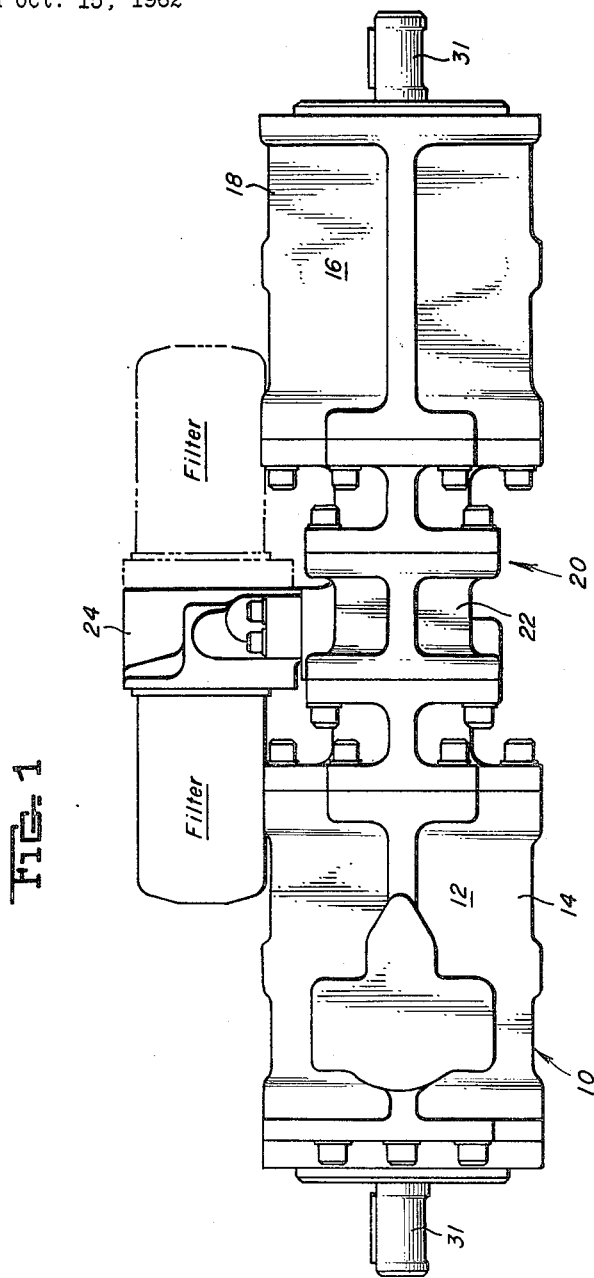
INVENTORS
TADEUSZ BUDZICH
ARNOLD PITT
By
Attorney

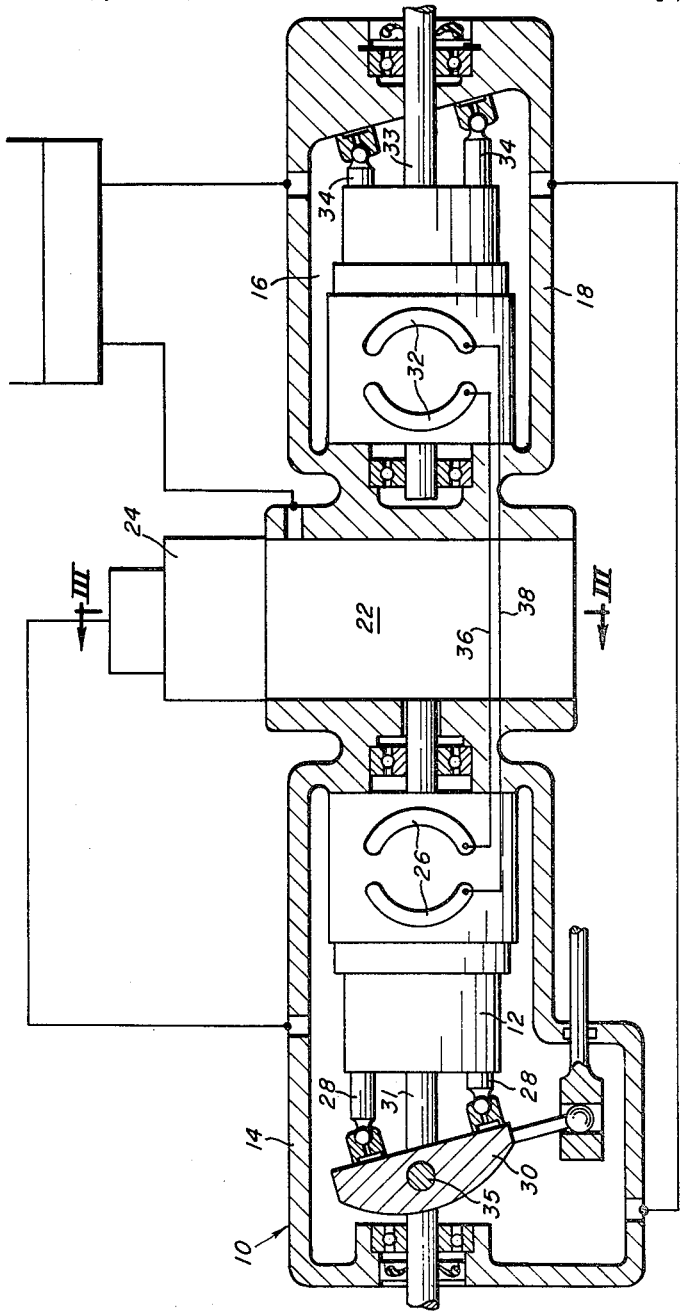

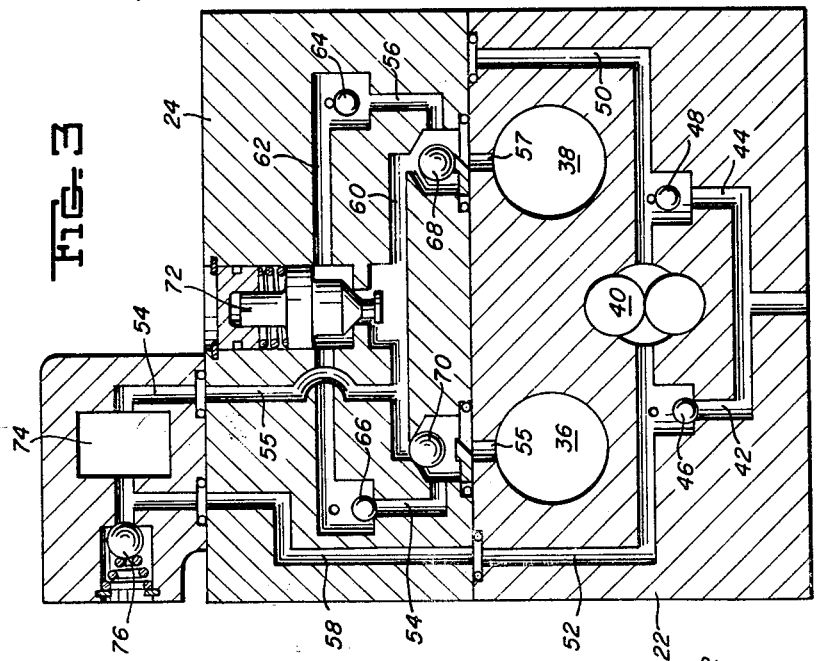
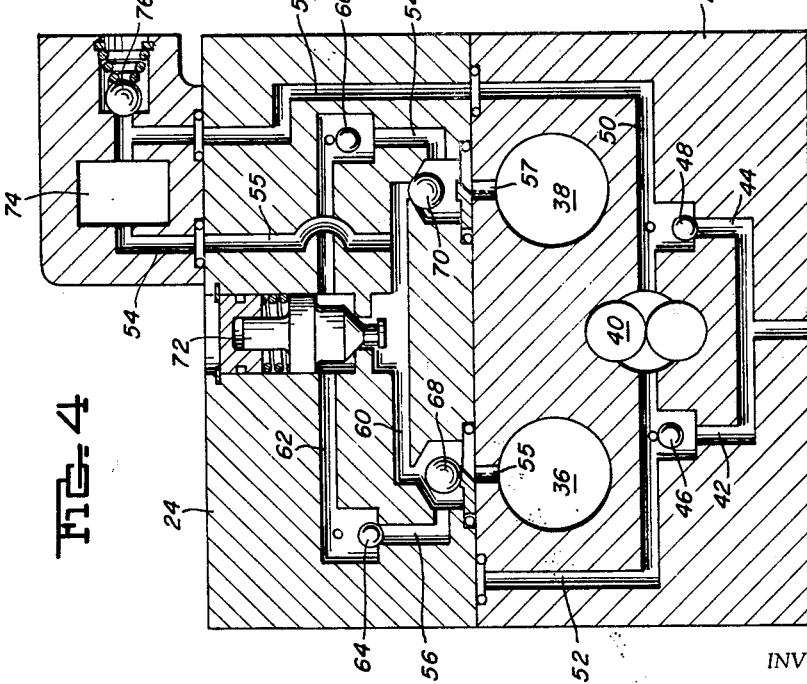

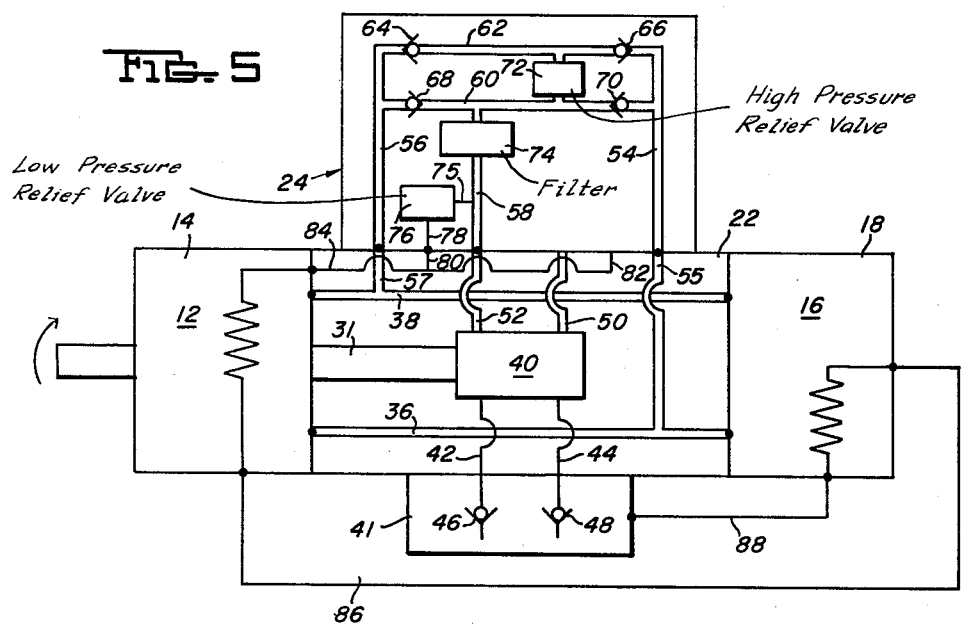
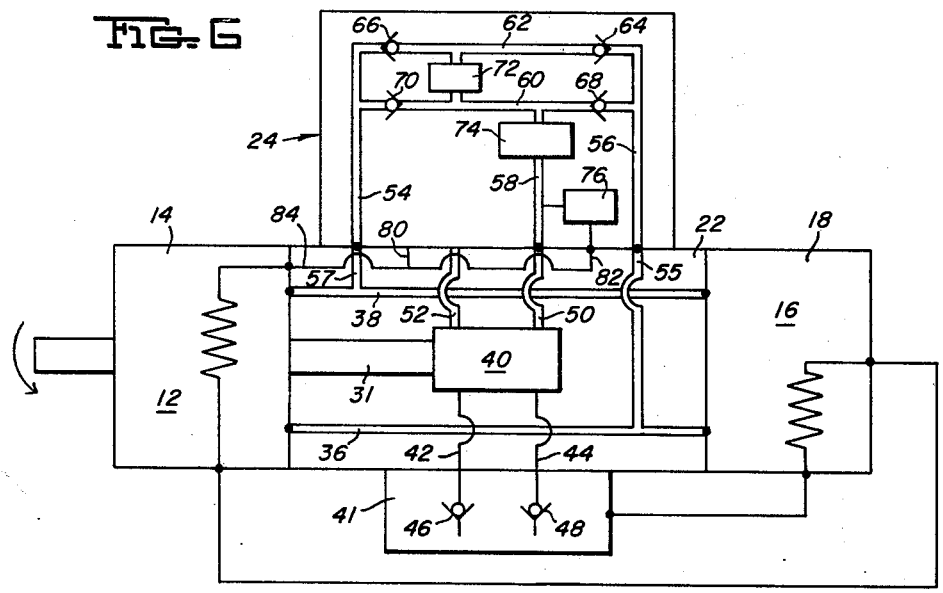

United States Patent Office 3,166,905
Patented Jan. 26, 1965

1

3,166,905
FLUID DISTRIBUTING AND CIRCULATING
SYSTEM
Tadeusz Budzich, 3344 Colwyn Road, Cleveland, Ohio, and Arnold Pitt, 5 Hillgarden Road, Weston, Ontario, Canada
Filed Oct. 15, 1962, Ser. No. 230,762
11 Claims. (Cl. 60—53)

The present invention relates to hydrostatic transmission circuits and, in particular, to a fluid distributing and circulating system for use therewith.

Conventionally, hydrostatic transmissions embody a fluid motor and a fluid power pump, which is normally of the variable-displacement type that may be hydraulically reversed to permit the direction of rotation of the fluid motor to be changed at will. Since the power level developed in a hydrostatic transmission necessitates a high rate of fluid circulation between the pump and motor, a closed fluid circuit is required to minimize circulation losses of the high-pressure fluid. Within the closed circuit, small volumes of fluid must circulate at extremely high flow rates from the pump, to the motor, and back again. Consequently, fluid loss resulting from leakage must be replenished on a substantially continuous basis. This requires the use of a supercharging pump capable of supplying fluid at a pressure level equalling the maximum pressure level existing at the location within the circuit at which the make-up fluid from the supercharging pump is introduced, which is the low-pressure branch of the circuit. In certain instances, such as when the motor is idling, the pressure within the circuit will drop to a relatively low level; hence, loss of fluid by leakage will be greatly decreased over that occurring at high-pressure levels. Consequently, if a continuous flow of make-up fluid is provided, means such as relief valves, must be provided for diverting the excess make-up fluid away from the circuit.

In addition, since the fluid power pump may be hydraulically reversed, which in turn causes the previous high-pressure branch of the circuit to become the low-pressure branch, the make-up fluid from the supercharging pump must now be diverted to the existing low-pressure branch. This normally requires an exceedingly complex arrangement of check valves provided between the supercharging pump and the high- and low-pressure branches of the circuit.

It is further necessary to protect the circuit against damage by high-pressure surges of fluid caused by a sudden fluctuation in the load upon the motor. Depending upon the setting of the fluid power pump, as previously mentioned, the direction of flow within the circuit is reversed to alternate the high- and low-pressure branches of the circuit. Therefore, two relief valves, each capable of by-passing the full rate of flow of the circuit, must normally be provided for sufficient overload protection. Since the fluid removed by the relief valve must be introduced to the low pressure branch of the circuit, unless an oversize supercharging pump is employed, a duplicate arrangement of check valves and piping for each relief valve is required for this purpose. This, of course, further adds to the size and complexity of the installation. Furthermore, duplicate filters must be provided for filtering the fluid introduced to the alternate low-pressure branches of the circuit.

2

The difficulties above are further compounded by the fact that the direction imparted to the shaft of the fluid power pumps varies from vehicle to vehicle and is not predictable in advance. Since the supercharging pump is normally driven by the shaft of the fluid power pump and its polarity is governed by the direction of rotation of the shaft, the arrangement of ducts and piping used with the supercharging pump must differ according to the direction of shaft rotation and consequently the polarity of the supercharging pump. Hence, a standardized system that may be used no matter which direction of rotation is imparted to the pump, no matter in which direction its shaft rotates is not presently available.

It is therefore an object of this invention to provide a distributing and circulating system that performs all the required functions incident to hydrostatic transmission systems, which minimizes the necessary number of ducts and check valves to an extent sufficient to permit unitized body construction of the system.

A further object of this invention is to provide a system in which the unitized body construction thereof serves as the structure for tying together the fluid power pump and fluid motor in a single, rigid, closed-circuit unit.

Another object of this invention is to provide a standardized system that may be used with hydrostatic transmission circuits having fluid power pumps with shaft rotation in either direction by merely reversing the mounting of one section of the system.

Still another object of this invention is to provide a system wherein the check valves employed perform several different functions thereby reducing the number of check valves over that required in conventional systems wherein separate check valves must be employed for each individual function.

Still a further object of this invention is to provide a system wherein only a single fluid filter is required.

It is also an object of this invention to provide a system having only one overload pressure reducing means that is effective to protect the circuit from damage during any of the changing conditions of flow and pressure, such as those occurring when the fluid power pump is hydraulically reversed.

These and other objects as well as a complete understanding of the invention will be apparent from a consideration of the following description and drawings, in which:

FIGURE 1 is an installation view of the distributing and circulating system of this invention in a hydrostatic transmission;

FIGURE 2 is a diagrammatic view of the position of the distributing and circulating system with respect to the hydrostatic transmission and cooling circuit, and acting as a structural tying member between the motor and the pump;

FIGURE 3 is a sectional view taken substantially along line III—III of FIGURE 2;

FIGURE 4 is a view similar to that of FIGURE 3 with a section of the distributing and circulating system reversed;

FIGURE 5 is a fluid circuit diagram of the hydrostatic transmission showing the distributing and circulating system diagrammatically with the shaft rotation of the fluid power pump in the direction shown by the arrow; and FIGURE 6 is a view similar to the hydrostatic transmission of FIGURE 5 but with the direction of shaft rotation reversed and a section of the distributing and circulating system also reversed.

With reference to the drawings and particularly FIGURES 1 and 2, a transmission unit, designated generally as 10 has a fluid power pump 12 mounted in a pump housing 14. A fluid motor 16 is mounted in a motor housing 18, and the fluid distributing and circulating system of this invention designated generally as 20 is interposed therebetween. The system 20 includes a connecting section 22 structurally tying together the pump 12 and motor 16. The system 20 also has a reversible control section 24 mounted on the connecting section 22. The position of section 24 is dependent upon the direction imparted to the shaft of the fluid-power pump of the particular vehicle with which the apparatus is used. The fluid power pump 12 is of conventional design being provided with conventional kidney-shaped ports 26, a shaft 31, and pistons 28 that coacts with a swashplate 30 adjustably mounted on pin 35. The fluid motor 16 also is of conventional design being provided with conventional kidney-shaped ports 32, a shaft 33, and pistons 34. The kidney-shaped ports 26 and 32 of the pump and motor, respectively, are connected by fluid passages 36 and 38, which extend through the connecting section 22 and join the pump and motor in a closed fluid circuit in a well-known manner.

Referring now to FIGURES 5 and 6, a supercharging pump 40, preferably of the gear type, is connected to and driven rotatably by the shaft 31 of the fluid pump 12. Suction ducts 42 and 44 communicate between the supercharging pump 40 and a fluid reservoir tank 41 and are provided with check valves 46 and 48 respectively. Fluid discharge ducts 50 and 52 are connected to the supercharging pump 40 and provide alternate means for passing the fluid discharged from the supercharging pump 40. Depending upon the position of the reversible control section 24 with respect to the connecting section 22, which is dictated by the rotational direction of the shaft 31, one of the discharge ducts 50 or 52 is blocked and the other communicates with main fluid-supply line 58 adapted to carry fluid from the supercharging pump 40 into the reversible control section 24. When the control section 24 is connected as shown in FIGURE 5, fluid ducts 54 and 56 are connected to fluid passages 36 and 38 through ducts 55 and 57, respectively. If the control section 24 is reversed, as shown in FIGURE 6, the duct 54 connects with the duct 57 and consequently the passage 38, and the duct 56 connects with the duct 55 and consequently the passage 36. Cross passages 60 and 62 serve to connect the ducts 54 and 56 within the control section 24. Check valves 64 and 66 are provided near the opposite ends of the cross passage 62, and check valves 68 and 70 are provided near the opposite ends of the cross passage 60. These valves isolate the high-pressure fluid from the low-pressure fluid within the control section 24, as will be explained hereafter. A high-pressure relief valve 72, which protects the circuit against any overload, is connected between the cross passages 60 and 62.

The main fluid supply line 58 is connected to the cross passage 60 through a conventional fluid filter 74. A duct 75 connects with the supply line 58 at a point between its connection with discharge duct 50 or discharge duct 52 and the filter 74, and provides for communication between the supply line 58 and a low-pressure relief valve 76 opening into a discharge duct 78. The discharge duct 78 is connected to the cooling system for the transmission through one of two alternate ducts 80 and 82 depending upon the position of the control section 24. The cooling system includes a passage 84 connected to the pump housing 14. A passage 86 extends from the pump housing 14 to the motor housing 18, and a passage 88 connects the motor housing 18 with the tank 41.

With respect to the operation of the fluid distributing and circulating system, reference should be made to FIGURES 5 and 6. In FIGURE 5, the rotational direction of the shaft 31 in the direction indicated by the arrow causes the polarity of the supercharging pump 40 to be such that it withdraws fluid from the tank 41 through the suction duct 44. This fluid under pressure passes into the alternate suction duct 42 and closes check valve 46 and thus prevents the return of this fluid to the tank 41. The fluid is discharged through discharge duct 52. Consequently, the control section 24 must be positioned as shown in FIGURE 5 so that the fluid pumped through discharge duct 52 will pass into the control section via the main fluid-supply line 58. In this instance the quantity of the fluid in the main fluid supply line 58 necessary to replenish that which has leaked from the circuit passes through filter 74, cross passage 60, check valve 68, duct 56, and thence through duct 57 to low-pressure fluid passage 38. The low-pressure fluid passage 38 will accept only the amount of fluid required to make up for leakage losses, and the remainder of the fluid from the supercharging pump 40 passes through the low-pressure relief valve 76, into discharge duct 78 and then into the cooling system from which it returns to the tank 41. Since this excess fluid used for cooling purposes is diverted to the cooling system at a location in the main fluid supply line 58 upstream of the filter 74, only the make-up fluid that is introduced to the circuit is filtered. Hence, the filter is not subjected to the full fluid flow from the supercharging pump, which serves to greatly extend its life.

The fluid flowing through the high-pressure fluid passage 36 passes through duct 55 into duct 54. It is prevented from entering cross passage 60 by the action of check valve 70 positioned therein; however, it enters cross passage 62 through check valve 66, but check valve 64 prevents its entry into duct 56. As previously explained, duct 56 is carrying the make-up fluid to the low-pressure fluid passage 38. Hence, it may be seen that the check valves 64 and 70 isolate the high-pressure fluid of the circuit from the low-pressure fluid provided by the supercharging pump 40. The high-pressure relief valve 72, which protects the circuit against an overload is interposed between the cross passage 62, which contains high-pressure fluid, and the cross passage 60, which contains low-pressure fluid. If the fluid pressure level within the high-pressure fluid passage 36 exceeds the preload setting of the relief valve 72, the valve operates in the conventional manner to pass fluid from the cross passage 62 to the cross passage 60, which is at a relatively lower pressure. The fluid is then introduced to the low-pressure fluid passage via ducts 56 and 57.

If the fluid pump 12 is hydraulically reversed by adjustment of its swash plate 30 about pin 35, then the fluid flow through passages 36 and 38 will be reversed from that previously described. However, this reversal is not accompanied by a reversal in the direction of rotation of pump shaft 31 and hence the supercharging pump 40 will continue to deliver fluid to duct 52. In this instance, the passage 38 becomes the high-pressure fluid passage, and the passage 36 becomes the low-pressure fluid passage. Consequently, make-up fluid from the supercharging pump 40 must now be introduced to the passage 36 rather than the passage 38. The quantity of fluid required as make-up in the circuit is passed through filter 74, as previously explained; it flows through cross passage 60, check valve 70, and thence through ducts 54 and 55 to the existing low-pressure fluid passage 36. The high-pressure fluid flowing through passage 38 enters the duct 56 but is isolated from the low-pressure fluid by check valves 66 and 68. Again the high-pressure relief valve 72 is interposed between the high-pressure fluid in cross passage 62 and the low-pressure fluid in cross passage 60. In the presence of an overload, the high-pressure fluid relieved from the cross passage 62 enters cross passage 60, flows through check valve 70, duct 54, and finally enters the circuit at low-pressure fluid passage 36 through duct 55. The fluid from the supercharging pump that is not required as make-up in the circuit is introduced to the cooling system in the manner previously described.

In FIGURE 6, the rotational direction of shaft 31, as indicated by the arrow, is reversed with respect to that shown in FIGURE 5. Therefore, the polarity of the supercharging pump 40 is such that it withdraws fluid from the tank 41 through the suction duct 42. This fluid under pressure passes into the alternate suction duct 44 to close check valve 48 and thus prevent the return of this fluid to the tank 41. The fluid is discharged from the supercharging pump through discharge duct 50. Consequently, the control section must be positioned as shown in FIGURE 6, which is reversed from that of FIGURE 5, so that the fluid pumped through discharge duct 50 will pass into the control section via the main fluid supply line 58. Assuming that the passage 36 is the high-pressure fluid passage and that the passage 38 is the low-pressure fluid passage, the fluid from the supercharging pump 40 passing through the main fluid supply line 58 that is required as make-up in the circuit flows through the filter 74 and the excess is by-passed by means of the low pressure relief valve 76 to the cooling system via discharge duct 78 and then through duct 82. The make-up fluid leaving filter 74 passes through cross passage 60, check valve 70, duct 54, and thence to the low-pressure fluid passage 38 through duct 57. The high pressure fluid from passage 36 enters connecting ducts 55 and 56 and its flow within the cross passages 60 and 62 is blocked by check valves 68 and 66, respectively. Again, these valves serve to isolate this high pressure fluid from the low pressure fluid. The high pressure relief valve 72 is again interposed between the high pressure fluid in cross passage 62 and the low pressure fluid in cross passage 60. In the presence of an overload this valve diverts high pressure fluid to the low pressure fluid passage 38 in the manner previously explained.

If the fluid flow through the circuit is hydraulically reversed to make the passage 38 the high-pressure fluid passage, the make-up fluid leaving the filter 74 passes into cross passage 60, through check valve 68, ducts 56 and 55, and into the low-pressure fluid passage 36. The high-pressure fluid from the passage 38 enters ducts 57 and 54 and flows through cross passage 62 until blocked by check valve 64. Its entry into cross passage 60 is stopped by check valve 70. Hence, the check valves 64 and 70 isolate this high pressure fluid from the low pressure fluid. The high pressure relief valve is still interposed between the high pressure fluid in cross passage 62 and the low pressure fluid in cross passage 60. High pressure fluid relieved from the cross passage 62 by the valve passes through cross passage 60, check valve 68, ducts 56 and 55, and enters the low pressure fluid passage 36.

Referring now to FIGURES 3 and 4, the physical construction of the system is shown with the control section in its two positions. The actual valving structure is shown in these two figures. The various ducts and passages are illustrated in their physical positions.

It should be noted that the magnitude of the pressure in the high pressure fluid passage will vary according to the operation of the motor. However, even when the motor is idling and thus the pressure within this passage is at its lowest level, fluid will flow through the circuit. Therefore, one of the passages, 36 or 38, will be at a pressure level relatively higher than the other and thus is a high pressure passage relative to the other passage.

While a particular embodiment of the invention has been illustrated and described, various modifications may obviously be made without departing from the spirit and scope of the invention defined by the appended claims.

What is claimed is:

1. In a hydrostatic transmission having a fluid power pump and a fluid motor, the improvement which comprises a fluid distributing and circulating system interposed between said power pump and said motor, said distributing and circulating system including a connecting section and a control section, said connecting section having high pressure fluid conducting means and low pressure fluid conducting means arranged to connect said power pump and said motor in a closed circuit, a supercharging pump, first and second passage means arranged to supply fluid from said supercharging pump to said control section, said supercharging pump being connected to deliver fluid to said first passage upon rotation in one direction and to said second passage upon rotation in the opposite direction, said control section being selectively positionable and having means arranged to introduce fluid from either of said passages to said low pressure fluid conducting means.

2. The combination of claim 1 further characterized by said supercharging pump being driven in timed relationship with said fluid power pump.

3. The combination of claim 1 further characterized by a fluid reservoir, first and second suction ducts connecting said reservoir with said supercharging pump, and means for selectively closing one of said ducts and drawing fluid from the other of said ducts depending upon the direction of rotation of said supercharging pump.

4. The combination of claim 1 further characterized by a filter positioned in said control section and adapted to filter only the fluid introduced to said low pressure fluid conducting means.

5. The combination of claim 1 further characterized by a low pressure relief valve adapted to maintain the fluid introduced to said low pressure fluid conducting means at a constant, preselected pressure level.

6. The combination of claim 1 further characterized by a filter positioned in said control section and adapted to filter only the fluid introduced to said low pressure fluid conducting means, and a low pressure relief valve adapted to maintain the fluid introduced to said low pressure fluid conducting means at a constant, preselected pressure level.

7. The combination of claim 1 further characterized by pressure relief means operative to limit the pressure within said high pressure fluid conducting means.

8. The combination of claim 7 further characterized by said pressure relief means being contained within said control section.

9. In a hydrostatic transmission having a fluid power pump including a pump housing and a motor including a motor housing, the improvement which comprises a fluid distributing and circulating system interposed between said power pump and said motor, said distributing and circulating system including a connecting section and a control section, said connecting section having high pressure fluid conducting means and low pressure fluid conducting means arranged to connect said pump and said motor in a closed hydraulic circuit, a supercharging pump adapted to supply fluid to said control section, means for phasing a portion of said fluid from said control section to said low pressure fluid conducting means to compensate for fluid loss and a single filter filtering only said diverted portion of fluid.

10. The combination of claim 9 further characterized by means for diverting the fluid not phased to said low pressure fluid conducting means to one of said housings for cooling.

11. A hydrostatic transmission comprising a pump including a pump housing and a pumping unit, a motor including a motor housing and a motor unit, said pump and motor each having fluid inlet means and fluid outlet means, first and second fluid conducting means connecting said pump and said motor in a closed fluid circuit, one of said fluid conducting means being at a pressure substantially lower than the other of said fluid conducting means, a supercharging pump connected to introduce fluid into said one fluid conducting means, a relief valve adapted to maintain a selected discharge pressure from said supercharging pump, check valve means interposed between said supercharging pump and said fluid conducting means adapted to phase at least a portion of the discharge from said supercharging pump to said one fluid conducting means and isolate said supercharging pump from said other fluid conducting means, a filter positioned to filter only said discharge phased to said one fluid conducting means, and means adapted to divert the portion of said discharge not phased to said one fluid conducting means to at least one of said housings to effect a cooling thereof.

References Cited by the Examiner
UNITED STATES PATENTS

| | | | |
|---|---|---|---|
| 1,717,814 | 6/29 | Strong et al. | |
| 2,183,541 | 12/39 | Centervall | 60—53 |
| 2,461,116 | 2/49 | Jeffrey | 60—53 |
| 2,621,479 | 12/52 | Wright | 60—53 |
| 2,961,829 | 11/60 | Weisenbach | 60—53 |

EDGAR W. GEOGHEGAN, *Primary Examiner.*

JULIUS E. WEST, *Examiner.*